United States Patent
Ur et al.

(10) Patent No.: US 11,645,666 B2
(45) Date of Patent: May 9, 2023

(54) CROWD DEMOGRAPHIC ANALYSIS

(71) Applicant: Show Advertising Ltd., Caesarea (IL)

(72) Inventors: Shmuel Ur, Shorashim (IL); Ori Arditi, Tel-Avivo Yafo (IL); Ilan Paliov, Kefar veradim (IL); Shay Karpeles, Ets Efraim (IL)

(73) Assignee: SHOW ADVERTISING LTD., Caesarea (IL)

( * ) Notice: Subject to any disclaimer, the term of this patent is extended or adjusted under 35 U.S.C. 154(b) by 0 days.

(21) Appl. No.: 17/649,107

(22) Filed: Jan. 27, 2022

(65) Prior Publication Data
US 2022/0237638 A1   Jul. 28, 2022

Related U.S. Application Data

(60) Provisional application No. 63/142,535, filed on Jan. 28, 2021.

(51) Int. Cl.
*G06Q 30/02* (2023.01)
*G06Q 30/0204* (2023.01)
*G06Q 30/0251* (2023.01)

(52) U.S. Cl.
CPC ..... *G06Q 30/0204* (2013.01); *G06Q 30/0271* (2013.01)

(58) Field of Classification Search
CPC ............ G06Q 30/0204; G06Q 30/0271
See application file for complete search history.

(56) References Cited

U.S. PATENT DOCUMENTS

| 8,786,650 | B1* | 7/2014 | Eller | B41J 3/4073 |
| | | | | 705/2 |
| 2012/0053958 | A1* | 3/2012 | Marshall | G06Q 30/02 |
| | | | | 705/2 |
| 2012/0179481 | A1* | 7/2012 | Patel | G06Q 30/02 |
| | | | | 705/2 |
| 2015/0067075 | A1* | 3/2015 | Sheppard | G06Q 30/00 |
| | | | | 709/206 |
| 2021/0319887 | A1* | 10/2021 | Derrick, Jr. | A61B 5/7275 |
| 2022/0101326 | A1* | 3/2022 | Kim | H04L 9/50 |

OTHER PUBLICATIONS

University of Chicago, Marianne Bertrand, "A Field Experiment on Labor Market Discrimination", American Economic Review, No. 4 p. 991-1013 (Year: 2004).*
"How Well can Machine Learning Predict Demographics of Social Media Users?" by Nina Cesare (Year: 2017).*
C. Bergsma "Name and Location Clustering on Twitter" (Year: 2013).*

* cited by examiner

*Primary Examiner* — Breffni Baggot
(74) *Attorney, Agent, or Firm* — Tutunjian & Bitetto, P.C.

(57) ABSTRACT

A method, an apparatus and a computer program product for evaluating demographics of viewers of live-streamed videos. A stream data of a video stream provided to an audience over the Internet via a live-streaming platform may be obtained. The stream data comprise information describing a content of the video stream. Each viewer may be identified in the video stream using a handle. Demographic information of a viewer may be estimated, automatically by a computerized device, based on the stream data and the handle of the viewer. An aggregated demographic information of the audience may be estimated based on the demographic information of a plurality of viewers comprised by the audience. Actions may be performed based on the aggregated demographic information of the audience.

20 Claims, 7 Drawing Sheets

CROWD DEMOGRAPHIC ANALYSIS

CROSS-REFERENCE TO RELATED APPLICATION

This application claims the benefit of provisional patent application No. 63/142,535 filed Jan. 28, 2021, titled "EVALUATING DEMOGRAPHICS OF AUDIENCE OF A STREAM", which is hereby incorporated by reference in its entirety without giving rise to disavowment.

TECHNICAL FIELD

The present disclosure relates to crowd analysis in general, and to evaluating demographics of audience of a stream, in particular.

BACKGROUND

Virtual advertising in videos, such is in YouTube™ videos, TV, sport events videos, and the like, enables viewing a campaign within the video to multiple viewers, simultaneously or apart. Advertising in the form of videos can be attached during or before the video is played, may be part of the video, such as playing at the bottom, embedding an ad in a certain area within the video, and the like. Different models may be used for online virtual advertising, such as impressions, clickthrough and referrals. While impression advertising model is utilized also in TV advertising, clickthrough and referrals may not be possible.

Compensation for advertising in such videos may be provided by advertisers, based on predefined measurements, rough estimation of the size of the audience, rating, or the like.

BRIEF SUMMARY

One exemplary embodiment of the disclosed subject matter is a method comprising: obtaining a stream data of a video stream, wherein the video stream is a stream of video provided to an audience over the Internet via a live-streaming platform, wherein the stream data comprise information describing a content of the video stream; obtaining a handle of a viewer of the video stream, wherein the viewer is identified in the video stream using the handle, wherein the audience comprise the viewer; estimating demographic information of the viewer, wherein said estimating the demographic information of the viewer is performed automatically by a computerized device based on the stream data and based on the handle of the viewer; and performing an action based on the estimated demographic information of the viewer.

Optionally, said estimating the demographic information comprises obtaining one or more messages associated with the handle; and analyzing the one or more message to estimate the demographic information.

Optionally, the one or more messages comprise one or more online chat messages that are performed over the live-streaming platform, while the video stream is provided to the audience.

Optionally, the one or more messages comprise one or more online chat messages that are performed over the live-streaming platform, wherein the one or more online chat messages comprise historic messages that are identified as originating from the handle during a provisioning of a different video stream via the live-streamlining platform.

Optionally, the one or more messages are obtained from a different platform than the live-streaming platform, wherein the one or more messages are identified as belonging to a user having a user name that is within a similarity measurement threshold to the handle, wherein one or more messages are publicly visible in the different platform.

Optionally, said estimating the demographic information comprises: analyzing a text defining the handle to estimate the demographic information therefrom.

Optionally, the handle is not associated with any participation in an online chat that is performed by the live-streaming platform during the provisioning of the video stream.

Optionally, said analyzing the text defining the handle comprises: determining, based on the text defining the handle, at least one of: a gender of the viewer, a nationality of the viewer, and an age of the viewer.

Optionally, said analyzing the text defining the handle comprises: extracting a sub-portion of the text defining the handle; and determining the demographic information based on the sub-portion of the text defining the handle.

Optionally, said analyzing the text defining the handle comprises: utilizing a handle similarity measurement, wherein the handle similarity measurement is based on groups of handles having similar estimated demographic information associated therewith, whereby implicitly defining contextual similarity between handles.

Optionally, the contextual similarity comprises a conceptual similarity between a first alphabetical element in a first handle and between a second alphabetical element in a second handle, wherein the first alphabetical element and the second alphabetical element are textually different in a measurement above a spelling mistake threshold.

Optionally, said estimating the demographic information comprises: obtaining historic viewing information of the handle with respect to historic streams, wherein each historic stream is associated with an historic stream data; and estimating the demographic information based on the historic stream data.

Optionally, the stream data comprises at least one of: a content type of the video stream; a language of the video stream; a time in which the video stream is provided; and information about a streamer providing the video stream.

Optionally, said obtaining the handle of the viewer and said estimating the demographic information is performed with respect to a plurality of viewers of the video stream; and wherein said performing the action comprises: estimating an aggregated demographic information of the audience, wherein said estimating the aggregated demographic information is performed based on the demographic information of the plurality of viewers; and performing one or more actions based on the aggregated demographic information of the audience.

Optionally, the audience comprise the plurality of viewers and a set of additional viewers, wherein said estimating the aggregated demographic information is performed without having a direct estimation of the demographic information of the set of additional viewers.

Optionally, said performing the action comprises at least one of: providing an added content in the video stream based on the estimated demographic information of the viewer; providing a content externally to the video stream based on the estimated demographic information of the viewer; providing a content to another viewer based on the estimated demographic information of the viewer; performing a promotion action based on the estimated demographic information of the viewer to promote the video stream to at least one potential viewer; and modifying resources allocated for streaming the video stream, whereby affecting a service level of provisioning of the video stream.

Another exemplary embodiment of the disclosed subject matter is a computerized apparatus having a processor, the processor being adapted to perform the steps of: obtaining a stream data of a video stream, wherein the video stream is a stream of video provided to an audience over the Internet via a live-streaming platform, wherein the stream data comprise information describing a content of the video stream; obtaining a handle of a viewer of the video stream, wherein the viewer is identified in the video stream using the handle, wherein the audience comprise the viewer; estimating demographic information of the viewer, wherein said estimating the demographic information of the viewer is performed automatically by a computerized device based on the stream data and based on the handle of the viewer; and performing an action based on the estimated demographic information of the viewer.

Optionally, said obtaining the handle of the viewer and said estimating the demographic information is performed with respect to a plurality of viewers of the video stream; and wherein said performing the action comprises: estimating an aggregated demographic information of the audience, wherein said estimating the aggregated demographic information is performed based on the demographic information of the plurality of viewers; and performing one or more actions based on the aggregated demographic information of the audience.

Yet another exemplary embodiment of the disclosed subject matter is a computer program product comprising a non-transitory computer readable storage medium retaining program instructions, which program instructions when read by a processor, cause the processor to perform a method comprising: obtaining a stream data of a video stream, wherein the video stream is a stream of video provided to an audience over the Internet via a live-streaming platform, wherein the stream data comprise information describing a content of the video stream; obtaining a handle of a viewer of the video stream, wherein the viewer is identified in the video stream using the handle, wherein the audience comprise the viewer; estimating demographic information of the viewer, wherein said estimating the demographic information of the viewer is performed automatically by a computerized device based on the stream data and based on the handle of the viewer; and performing an action based on the estimated demographic information of the viewer.

Optionally, said obtaining the handle of the viewer and said estimating the demographic information is performed with respect to a plurality of viewers of the video stream; and wherein said performing the action comprises: estimating an aggregated demographic information of the audience, wherein said estimating the aggregated demographic information is performed based on the demographic information of the plurality of viewers; and performing one or more actions based on the aggregated demographic information of the audience.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
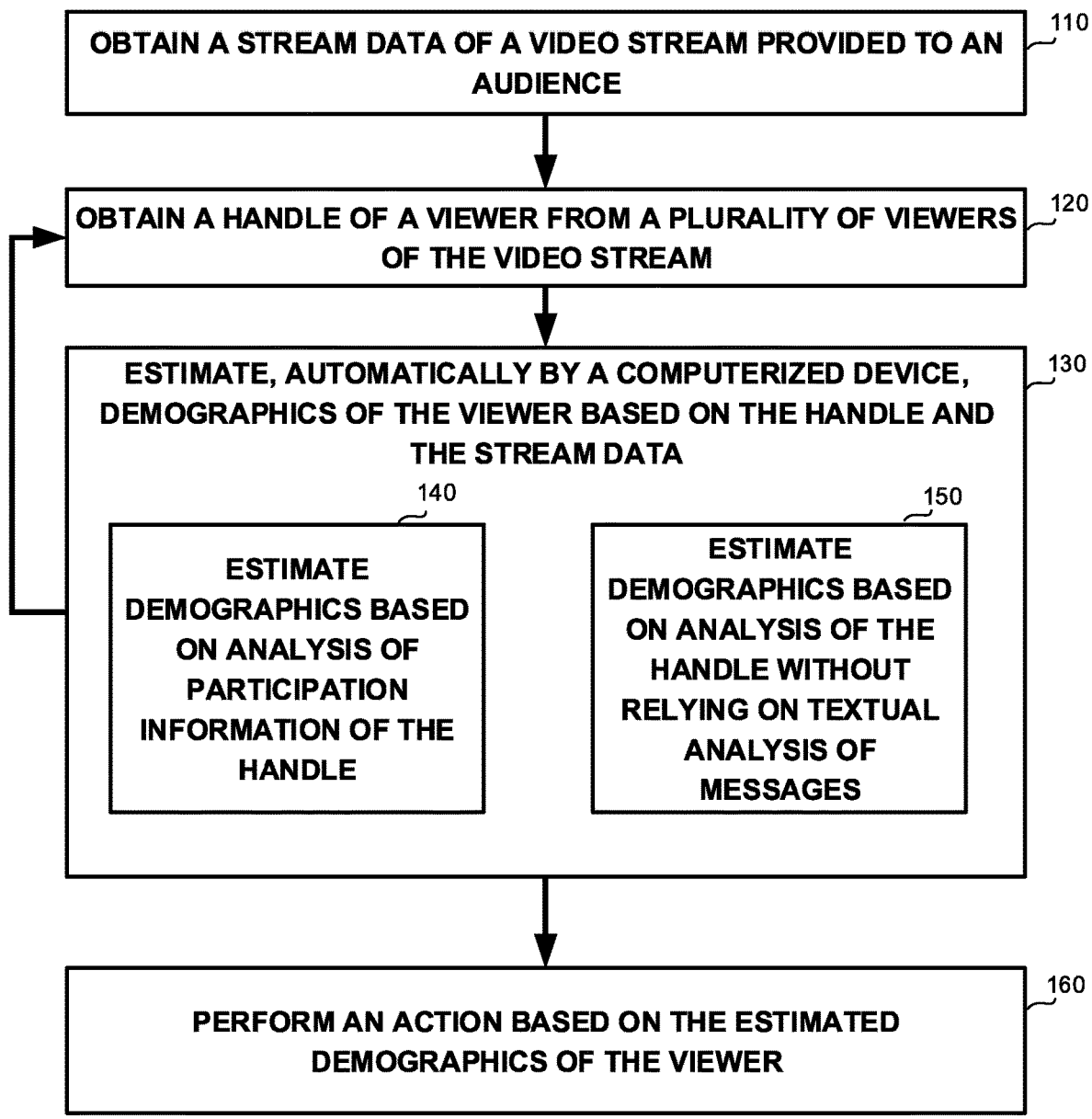
FIGS. 1A-1E show flowchart diagrams of methods, in accordance with some exemplary embodiments of the disclosed subject matter.

One technical problem dealt with by the disclosed subject matter is evaluating demographics of an audience of a video stream. In some exemplary embodiments, the video stream may be a one-to-many video streamed by a streamer to an audience over the internet. The audience may comprise multiple viewers, some of which watch the video simultaneously, in real-time, in different timings, online, offline, or the like. In some exemplary embodiments, the video may be streamed to the audience via a live-streaming platform. Each viewer may be associated with a local identifier in the live-streaming platform, such as a username, a handle, or the like. As an example, Twitch™ provides video live-streaming service that focuses on video game live-streaming, including broadcasts of esports competitions, music broadcasts, creative content, or the like. Each user in Twitch™ may have a local handle identifying her in Twitch™. While the local identifier, e.g., the username or the handle may be available for other users viewing the video, other information may not be available for external users, such as for advertisers, even if available to the streaming platform. Estimated demographics of the audience may be essential and required for many technical purposes, such as for adapting added content to the audience of the video stream, enabling accurate selection of campaigns to be suitable for promotion by the content provider, or the like.

In some exemplary embodiments, live-streaming platforms may enable streamers or content providers such as gamers, lifestyle casters to provide their content to multiple viewers and may support building communities around a shared and streamable interest. In some exemplary embodiments, the audience of the streamed video may be varying, may be different than the content provider herself, or the like. Such variation may cause the estimation of the demographic information of the audience even more challenging. As an examples, a large chunk of followers of female models may be middle age men, in addition to teenage female followers. Different portions of the audience may be associated with different features, different demographic data, different interests, or the like.

In some exemplary embodiments, some of the audience may comprise active viewers, involved with some participation while watching the video stream, such as participating in a live chat implemented during providing of the video stream, providing feedback to the video stream or the streaming, writing messages, or the like. Additionally or alternatively, many viewers from the audience may be silent viewers, non-active viewers, lurkers, may not be involved in any participation besides watching the video stream, or the like. The number of active viewers may depend on a type of the live-streaming platform, a type of the video stream, a content, a size of the audience, or the like. A portion of active viewers may vary from few percentages of the audience, such as about 10%, 20%, or the like, to a larger percentage, such as about 80%, 90%, or the like, of the audience. The only information that may be available on such silent viewers may be the handle. Estimating demographics of such silent viewers may be more and more challenging, as such demographics cannot be assumed to be similar to the entire demographics of more active viewers.

One technical solution is to automatically estimate demographic information of a viewer, based on a stream data of the video stream being provided to the viewer and based on the handle utilized to identify the viewer in the video stream.

In some exemplary embodiments, estimation of the demographic information based on the handle may be performed with respect to a plurality of viewers of the video stream, such as for the whole audience, a portion thereof, or the like. An aggregated demographic information of the audience may be estimated based on the demographic information of the plurality of viewers. An added content, such as an advertising campaign, a targeted ad, or the like, may be provided in the video stream based on the aggregated demographic information of the audience. It may be noted that in some cases the audience may comprise additional viewers in addition to the plurality of viewers that the demographic information thereof is unknown, cannot be estimated, or the like. The aggregated demographic information may be estimated without having a direct estimation of the demographic information of such additional viewers.

In some exemplary embodiments, the stream data may comprise information describing a content of the video stream, such as a content type of the video stream, a language of the video stream, or the like. Additionally or alternatively, the stream data may comprise other information of the video stream, such as a time in which the video stream is provided, or the like. Additionally or alternatively, the stream data may comprise information about a streamer providing the video stream, such as the streamer's name, information about the content usually provided by the streamer, or the like.

In some exemplary embodiments, a participation information associated with the handle may be available. The participation information may be about a participation of the handle in the live-streaming platform utilized for providing the video stream. The participation information may be about a participation of the handle while the video stream is provided to the audience, a historic participation of the handle, such as during providing a different video stream, a combination thereof, or the like. Additionally or alternatively, the participation information may be about a participation of the handle in another streaming platform. The demographic information of the viewer may be estimated based on an analysis of the participation information of the handle of the viewer.

In some exemplary embodiments, the participation information of the handle may be associated with a text written by or about the viewer, such as messages associated with the handle, from a chat service implemented in the streaming platform, or the like. The messages may be analyzed to estimate the demographic information of the viewer. In some exemplary embodiments, the messages may comprise online chat messages that are performed over the live-streaming platform, while the video stream is provided to the audience, historic messages that are identified as originating from the handle during a provisioning of a different video stream via the live-streamlining platform, or the like. Additionally or alternatively, the messages may be obtained from a different platform than the live-streaming platform, such as messages that are publicly visible in the different platform. The messages may be identified as belonging to a user having a user name that is within a similarity measurement threshold to the handle.

In some exemplary embodiments, text written by users, such as in chat, may be indicative of many features thereof. Different demographic information may be gleaned based thereon. As an example, the language of a user may be determined based on the language of the text. Additionally or alternatively, deeper information may be detected based on an analysis of the text. As an example, a determination whether the user is a native English speaker, and if not, what is her native language may be performed based on analysis of an English text written by her. Additionally or alternatively, demographic information such as age and gender may be determined based on the text, such as using machine learning techniques, using designated programs, or the like. As an example, an age of the user may be automatically determined based on text readability features. As another example, a gender of the user may be determined based on usage of keywords, based on writing style, or the like. Additionally or alternatively, other information, such as cultural preferences, political preferences, or the like, may be determined based on the text written by the users, the content of the chat, or the like.

Additionally or alternatively, the demographic information of the handle may be estimated based on an analysis of the handle without relying on textual analysis of messages written by the viewer. Such analysis may be performed when no participation information associated with the handle is available, when the available information is not sufficient for determining demographic data the analysis, in addition to the analysis of the textual data or separately from, or the like. As an example, the handle may not be associated with any participation in an online chat that is performed by the live-streaming platform during the provisioning of the video stream.

In some exemplary embodiments, analysis of the handle may comprise analyzing a text defining the handle, such as a profile data, a description, reviews written by other viewers, or the like, to determine demographic information of the viewer, such as gender, nationality, age, or the like. Additionally or alternatively analysis of the handle may comprise analyzing another textual data, such as tags or classifications of the video or the channel, or the like. Such textual data may be utilized to determine the content the users are interested in, preferences, or the like.

In some exemplary embodiments, the demographic information may be estimated based on the sub-portion of the handle. As an example, the sub-portion may comprise numerical characters, that may be indicative of a birthdate of the viewer, an age of the viewer, a numerical identifier of the viewer, or the like. As another example, the sub-portion may comprise alphabetical charterers that may be indicative of a first name of the viewer, interests of the viewer, or the like. The demographic information may be determined based on the analysis of the sub-portion, a combination of analysis of different sub-portions, or the like. As an example, a sub-portion of Moshe1978 may be extracted, such as "Moshe" or "1978". "Moshe" may be indicative of a male first name, in age between 40 to 60, a Hebrew native language, or the like. "1978" may be indicative of the year of birth of the viewer, or the like.

In some exemplary embodiments, the demographic information of the viewer may be estimated based on demographic data of viewers having similar handle names. In some exemplary embodiments, the similarity between the handles may be a partial similarity, may be determined only on alphabetic characters without numbers, or the like. Additionally or alternatively, A handle similarity measurement based on groups of handles having similar estimated demographic information associated therewith may be utilized. A contextual similarity between handles may be implicitly defined. The contextual similarity may comprise a conceptual similarity between a first alphabetical element in a first handle and between a second alphabetical element in a second handle. The first alphabetical element and the second alphabetical element may be textually different in a measurement above a spelling mistake threshold.

One technical effect of utilizing the disclosed subject matter is enabling an accurate estimation of demographic data of audience of live-streamed videos, with reduced time, effort and resources.

Another technical effect of utilizing the disclosed subject matter is enabling an accurate estimation of demographic data of audience of live-streamed videos without compromising privacy of the viewers, and without requiring any personally identifiable information (PII), or in addition to, from the streaming platform.

Yet another technical effect of utilizing the disclosed subject matter is enabling an accurate organic advertising in one-to-many videos. The estimated demographic data of the audience may be utilized for advertising in one-to-many live-streaming videos, such as by enabling performing auctions in a short time (e.g., few seconds, less than a minute, less than an hour, or the like), without a priori knowledge of an exact advertising slot, or having exact demographic data of a certain viewer. The disclosed subject matter enables providing accurate targeted campaigns to the audience of the video-stream, based on the estimated demographics.

Yet another technical effect of utilizing the disclosed subject matter is enabling computing a more efficient and accurate compensation metric for advertising. While naïve simple compensation metrics for advertising in videos provided by advertisers, may be based on predefined measurements, rough estimation of the size of the audience, rating, or the like; knowing estimated demographics may enable providing more effective compensation that depends on demographics of the audience. Advertisers may be enabled offer different profile-based compensations for different demographic profiles, such for specific ages, gender, location, race, religion, languages and the like.

Yet another technical effect of utilizing the disclosed subject matter is modifying resource utilization associated with the provisioning of the stream via the streaming platform. In some exemplary embodiments, a Service Level Agreement (SLA) property may be based on the identity of the audience, demographic information of the audience, identity of a specific viewer, demographic information of a specific viewer, or the like. In some exemplary embodiments, an efficient allocation of resources may be achieved, such as providing more resources for streams with targeted audience and reducing streams that are associated with non-targeted audience. The SLA property may be modified by various manners, such as but not limited to allocation of computation resources by the streaming platform, allocation of bandwidth to a specific stream, increasing/decreasing priority of packets associated with the stream, allocation of additional servers to perform the streaming operation, selecting different codecs (e.g., computational intensive codecs, or codecs that require a reduced amount of computation power), modifying resolution of the stream (e.g., selecting between alternative resolutions, requiring a different amount of data; for example, selecting between 480p, 720p, 1080p, 4K UHD, 8K UHD, or the like), modifying streaming protocol properties (e.g., having different bit rates, jitter, packet loss, or the like), or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, a stream data of a video stream may be obtained. The video stream may be a stream of video provided to an audience over the Internet via a live-streaming platform such as Twitch™, Instagram™, YouTube™, Snapchat™, Twitter™, Facebook™, VSCO™, Reddit™ WeChat™, QQ™, TikTok™, or the like. In some exemplary embodiments, the video stream may be provided to the audience by an identifiable streamer, such as a content provider, a known user of the live-streaming platform, such as an electronic game player, a social media influencer, or the like.

In some exemplary embodiments, the stream data may comprise information describing a content of the video stream, such as a metadata of the video stream, a content type of the video stream, a language of the video stream, a time in which the video stream is provided, information about a streamer providing the video stream, a combination thereof, or the like. As an example, a content of stream may be game, cooking, or the like. A subtype of the content may be a specific game, a specific cooking, or the like.

On Step 120, a handle of a viewer from the plurality of viewers of the video stream may be obtained. In some exemplary embodiments, the video stream may be provided by a streamer to the audience comprising many viewers, such as about few hundreds of viewers, about thousands of viewers, about few hundreds of thousands of viewers, or the like. In some exemplary embodiments, each viewer may be identified in the live-streaming platform using a handle. The handle may be a unique handle. The handle may be selected by the viewer, may be required to be generated in a certain format, such as being must include numeric characters, forbidden to include certain characters, or the like.

On Step 130, demographic information of the viewer may be automatically estimated by a computerized device based on the stream data and based on the handle of the viewer.

In some exemplary embodiments, the demographic information may comprise age, gender, language, location, or the like of the viewer. The demographic information may be determined based on a combination of analysis of both of the stream data and the handle, separately or in combination, or the like. As an example, an estimated language of the viewer may be determined based on the language spoken in the video stream, the language written in the video stream, such as in subtitles in the video stream, an origin of a name appearing in the handle, a language utilized by the viewer for communication, or the like. Additionally or alternatively, additional demographic information such as cultural preferences, political preferences, or the like, may be determined based on the content of the video stream. Such information may be enriched based on analysis of text written by the users, the content of the chat, analysis of other textual data, such as tags or classifications of the video or the channel, historic analysis of audiences of the content provider (e.g., the streamer), or the like.

On Step 140, participation information of the handle may be analyzed for estimation of the demographic information.

Figure 1B:
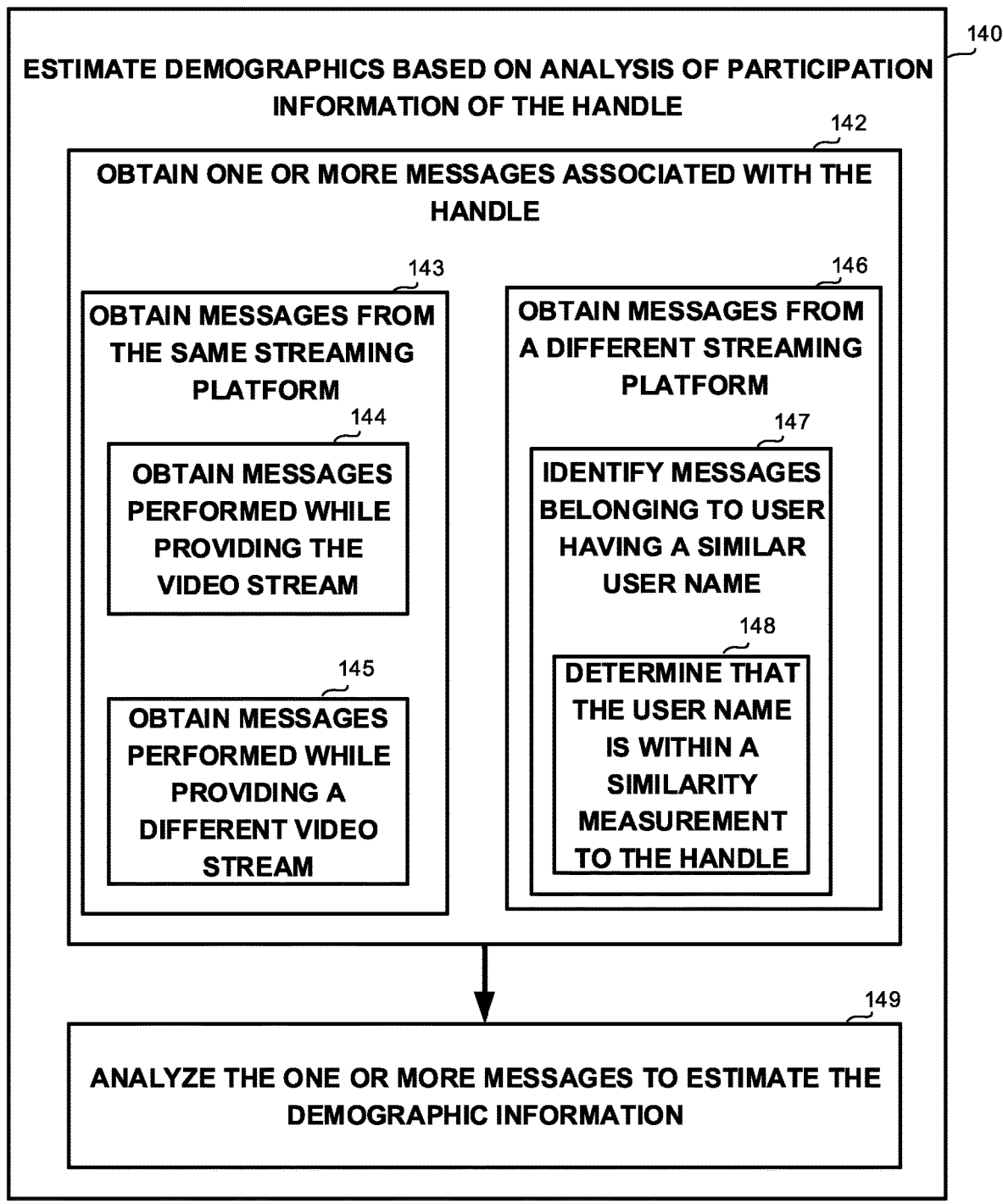
Figure 1C:
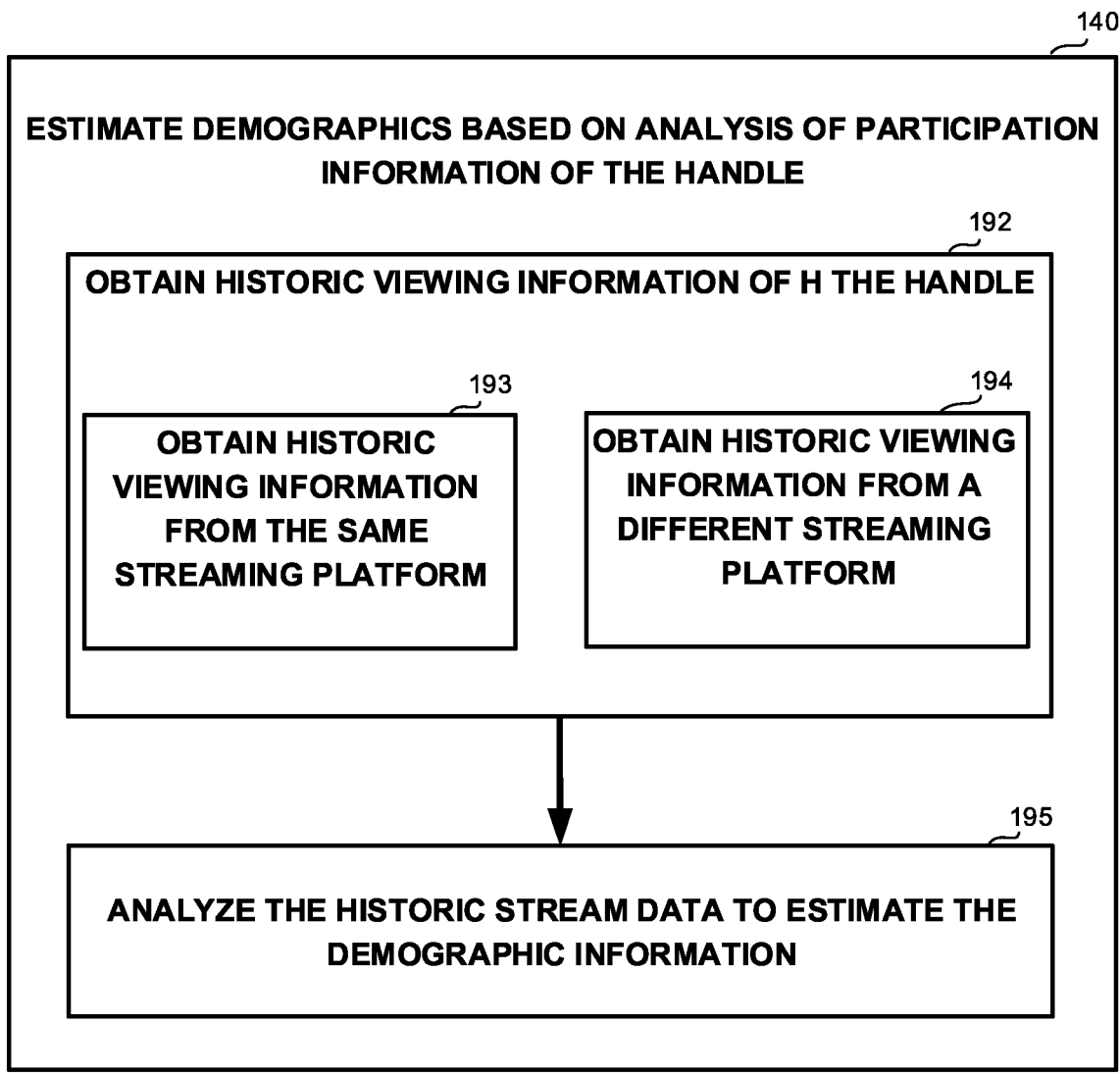

In some exemplary embodiments, the participation of the handle may comprise active participation, such as writing comments, participating in a chat, writing messages, or the like. (FIG. 1B) Additionally or alternatively, the participation may comprise indirect or passive participation, such as watching video streams, membership in groups, or the like. (FIG. 1C)

Figure 1D:
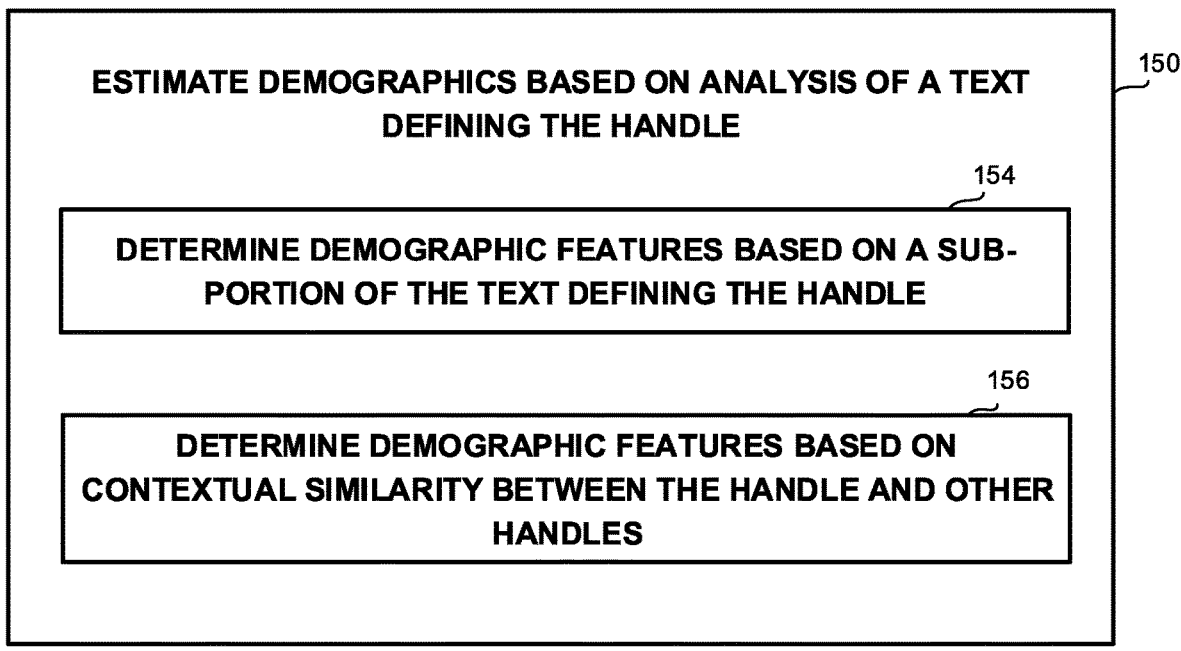

On step 150, the handle may be analyzed to estimate the demographic information therefrom without relying on textual analysis of messages written by the viewer. (FIG. 1D)

In some exemplary embodiments, the estimated demographics of the viewer may comprise a native language of the viewer, age of the viewer, gender of the viewer, location of the viewer, a nationality of the viewer (such as based on historical watching data and the other demographics), or the like.

Additionally or alternatively, a set of precited demographics of the viewer may be collected for each member of the plurality of viewers based on analysis of the handle and the stream data. The sets may be processed by neural networks or other machine learning or artificial intelligence techniques, to determine an estimated demographic data of the viewer.

In some exemplary embodiments, Steps 120-130 (obtaining the handle of the viewer and estimating the demographic information of the viewer) may be performed with respect to a plurality of viewers of the video stream, such as to all of the viewers, a portion of the viewers, or the like. In some exemplary embodiments, the audience of the video stream may comprise a set of viewers of which no direct estimation of their demographic information is performed such as because a direct estimation of the demographic information thereof cannot be performed, not feasible, or the like.

On Step 160, an action may be performed based on the estimated demographic information of the viewer. Referring now to FIG. 1B showing a flowchart diagram of a method, in accordance with some exemplary embodiments of the disclosed subject matter.

In some exemplary embodiments, the participation information may be obtained based on textual data available during providing of the video, such as chat service implemented in the live-streaming platform.

On Step 142, one or more messages associated with the handle may be obtained. In some exemplary embodiments, the one or more messages may be provided by the viewer in a chat service implemented during providing the video via the streaming platform.

In some exemplary embodiments, on Step 143, the one or more messages may comprise one or more online chat messages that are performed over the live-streaming platform. The one or more online chat messages may be performed while the video stream is provided to the audience (Step 144). Additionally or alternatively, the one or more online chat messages may comprise historic messages that are identified as originating from the handle during a provisioning of a different video stream via the live-streamlining platform (Step 145), prior to providing the video stream.

Additionally or alternatively, on Step 146, the one or more messages may be obtained from a different platform than the live-streaming platform. In some exemplary embodiments, messages from the different streaming platform may be analyzed in addition to messages from the live-streaming platform. Additionally or alternatively, the handle may not be associated with any participation in an online chat that is performed by the live-streaming platform during the provisioning of the video stream. The one or more messages may be publicly visible in the different platform. The one or more messages may be obtained without having a direct connection to the different platform (Step 147). As an example, the video stream may be provided in Twitch™, and the handle being analyzed may be "Shmue1191". The same handle may be utilized by the viewer in other platforms such as YouTube™.

In some exemplary embodiments, the one or more messages may be identified as belonging to the handle. Additionally or alternatively, the one or more messages may be identified as belonging to a user similar to the handle.

On Step 148, a determination that the user's name is within a similarity measurement to the handle. As an example, the messages may be provided by a user of a second platform different than the live-streaming platform. The user may be associated with a second local identifier in the second platform that is similar to the handle in the live-streaming platform. The similarity may be determined based on string matching techniques, profiles matching algorithms, or the like.

On Step 149, the one or more message may be analyzed to estimate the demographic information. In some exemplary embodiments, text written by users, such as in chat, may be indicative of many features thereof. Different demographic information may be gleaned based thereon. As an example, the language of a user may be estimated based on the language of the text. Additionally or alternatively, deeper information may be detected based on an analysis of the text. As an example, a determination whether the user is a native English speaker, and if not, what is her native language may be performed based on analysis of an English text written by her. Additionally or alternatively, demographic information such as age and gender may be estimated based on the text, such as using machine learning techniques, using designated programs, or the like. As an example, an age of the user may be automatically determined based on text readability features. As another example, a gender of the user may be determined based on usage of keywords, based on writing style, or the like. Additionally or alternatively, other information, such as cultural preferences, political preferences, or the like, may be determined based on the text written by the users, the content of the chat, or the like. Additionally or alternatively, other textual data, such as tags or classifications of the video or the channel may be utilized to determine the content the users are interested in, preferences, or the like.

Referring now to FIG. 1C showing a flowchart diagram of a method, in accordance with some exemplary embodiments of the disclosed subject matter.

In some exemplary embodiments, the participation information may comprise indirect participation data, such as a viewing history of the handle. The viewing history may comprise data of video streams watched by the handle.

On Step 192, historic viewing information of the viewer may be obtained. The historic viewing information may comprise stream data of historic streams viewed by the handle may be obtained. Each historic stream may be associated with a historic stream data that comprises features of the historic video stream, such as title, content type, language, time of watching, tags, or the like. Additionally or alternatively, the historic viewing information may be associated with previous analysis of the historic video stream, an analysis of an audience of the historic video stream, such as estimated demographic data thereof, or the like.

In some exemplary embodiments, the historic viewing information may be obtained from the same streaming platform. (Step 193). Additionally or alternatively, the historic viewing information may be obtained from other streaming platforms. Such information may be determined to be associated with the viewer based on a similarity between the handle and a username in the other streaming platforms. Referring to the example described in association with Steps 147-148, the viewing history of the handle "Shmue1191", may be obtained from YouTube™, as a viewing history of a user having a username "Shmue1191" or another username with a similarity measurement above a predetermined threshold, such as above 90%.

On Step 195, the demographic information of the handle may be estimated based on analysis of the historic viewing information.

Referring now to FIG. 1D showing a flowchart diagram of a method, in accordance with some exemplary embodiments of the disclosed subject matter.

On step 150, a text defining the handle may be analyzed to estimate the demographic information therefrom without relying on analysis of active participation of the viewer.

In some exemplary embodiments, the handle may not be associated with any participation in an online chat that is performed by the live-streaming platform during the provisioning of the video stream. An additional analysis may be performed on the handle itself (e.g., a text or a string defining the handle), such as a textual analysis thereof, relating to similar users, or the like.

In some exemplary embodiments, demographic features of the viewer may be determined based on analysis of the text defining the handle, such as a gender of the viewer, a nationality of the viewer, an age of the viewer. Additionally or alternatively, a classifier may be utilized to estimate the demographic information based on the text defining the handle. The classifier may be trained based on previously analyzed handles, based on auxiliary data of handle names, or the like, such as based on countries and languages list of male and female names, correlation between names age and gender, or the like. As an example, the most common names in Russian may be available in https://www.thoughtco.com/common-russian-names-4770041. Such list may be utilized to train the classifier. As another example, statistics of age and gender of names may be obtained from https://www-.sciencedirect.com/science/article/pii/S0969698915300540. As yet another example, gender distribution of certain alphabetical elements in handles may be determined based on previous analysis of handles, such as associating "princess" with female (girls), "George" with male men, or the like.

On Step 154, demographic features of the viewer may be determined based on a sub-portion of the text defining the handle. In some exemplary embodiments, a determination of the sub-portion of the text defining the handle to be extracted and analyzed may be performed based on a composition of the handle, based on other metadata of the video stream, based on a concrete comparison of other handless, or the like. In some exemplary embodiments, it may be determined that the relevant sub-portion of the handle for determination of demographic features may be alphabetical characters only, excluding numerical characters, symbols, or the like. As an Example, "Yossi124" may be considered to be associated with more similar demographic features to "yossi999" than to "Yossuf124".

Additionally or alternatively, certain substrings of the handles may be considered to be indicative of specific demographic features. Such substrings may comprise specific numbers. As an example, the substring "666" may have significance, and may be indicative of certain demographic features, such as interests, or the like. As another example, some numerical substrings may be indicative of a year of birth or other dates. As an example, the substring "1976" in the handle "Yossi_1976" may be indicative of an age of the viewer, while the substring "Yossi" in the handle "Yossi_1976" may be indicative of the gender, language, or the like. Additionally or alternatively, some substrings of the handle may be explicitly indicative of demographic features, may be indicative of information that demographics features can be extracted based thereon, or the like. As an example, the substring "loveCats" may be indicative that the viewer is interested in cats.

On Step 156, demographic features of the viewer may be determined based on contextual similarity between the handle and other handles (e.g., between texts defining the hanldes). In some exemplary embodiments, a handle similarity measurement may be utilized. The handle similarity measurement may be based on groups of handles having similar estimated demographic information associated therewith. The contextual similarity between handles may be implicitly defined based on the similarity between estimated demographic information. In some exemplary embodiments, the contextual similarity may not necessarily be associated with textual similarity. Given that each handle may be presented as a string of characters, some handles may have different contexts despite being presented as similar strings. As an example, the name "Diego" may be associated with different demographic features in in different contexts, such as in different languages, from different locations, or the like. On the other hand, other related handles that may presented as different strings, such as "Diogo" or "Thiago", may share certain demographic features, such as gender, age, or the like, but indicative of difference in other demographic features, such as language (an estimated language of "Diego" may be Spanish while the estimated language of "Diogo" may be Portuguese), location ("Thiago" is a spelling of the name used mostly in Brazil), or the like. As another example, handles comprising the names "Yossi" and "Yossuf", may be related names, however may be indicative of different demographic features (age, religion, language, nationality, or the like).

Additionally or alternatively, the contextual similarity may comprise a conceptual similarity between two alphabetical elements in two handles, such as a name element appearing in the handle, or any other alphabetical string. The first alphabetical element and the second alphabetical element may be textually different in a measurement above a spelling mistake threshold. Reoffering to the above example, according to a first similarity measurement "Yossi" and "Yossuf" may be considered to be contextually similar despite the textual difference.

In some exemplary embodiments, a similarity measurement for handles, or other handle distance measurements, may be learned and defined by Learning Module 210, based on previous data, auxiliary data of handle names, or the like. In some exemplary embodiments, the similarity measurement for handles may be determined based on human rules along with machine learning or classification on previously analyzed handles. Additionally or alternatively, the similarity measurement for handles may be determined based on manual marking of demographic features of handle, input from linguistic experts, or the like.

In some exemplary embodiments, in response to obtaining an unknown handle in Step 120, or a handle that may not be associated with a participation in the streaming platform, one or more contextual similar annotated handles may be determined. Each contextually similar handle may be associated with different similarity measurement. A weighted average of the demographics of the annotated handles may be determined based on the similarity measurements of each handle to evaluate the demographic of the unknown handle. Additionally or alternatively, only a portion of the text defining the handle may be searched for determining similar handles. The portion may be searched in general search engines, over the Internet, in names databases, in association lists, or the like.

Referring to the above-mentioned example, given the unknown handle "Yossi124", all the "YossiXYZ", where XYZ is a three digits number, may be determined to be similar handles, each of which may be associated with different similarity measurement (weight) based on similarity between "124" and "XYZ". A weighted average of the demographics of such "YossiXYZ" handles may be utilized to estimate the demographic of the unknown handle "Yossi124".

As another example, given a handle "Abelisaurus123" that the system is not familiar with, that no participation data is known for, that no similar handles are known or annotated by the system, or the like; the alphabetical element "Abelisaurus" may be searched over the Internet. On search result may be in a list of dinosaur associated handles, e.g., https://sortingwithstyle.com/dinosaur-names/. The demographic information of the handle may be estimated based on demographic information of similar handles (e.g. names) in the list, may be estimated based on characteristics of the list, or the like, having we may think that handles form the list are similar. As yet another example, search results may be related to movie characters from a specific movie, medieval weapons, or the like. The demographic information may be estimated based on the search results, association with results and demographic features, or the like.

In some exemplary embodiments, a determination whether to utilize estimated demographic data determined in Step 156 for further estimation, evaluation of demographics, training, or the like, based on a likelihood measurement determined with the estimation, based on a later confirmation of the estimated demographic data, or the like.

Figure 1E:
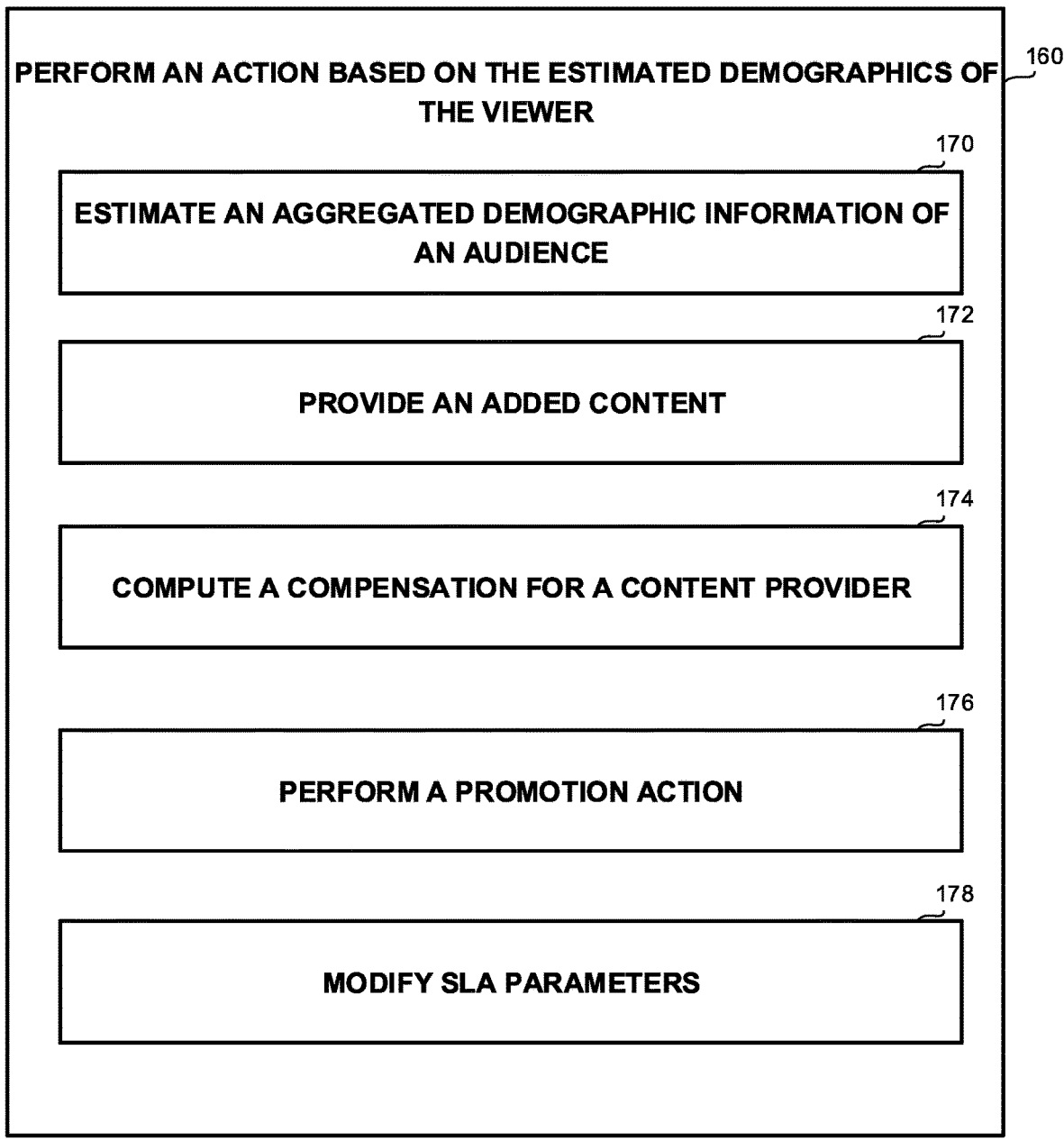

Referring now to FIG. 1E showing a flowchart diagram of a method, in accordance with some exemplary embodiments of the disclosed subject matter.

On Step 160, an action may be performed based on the estimated demographic information of the viewer. In some exemplary embodiments, the action may be performed based on the estimated demographic information of the viewer. Additionally or alternatively, the action may be performed based on estimated demographic information of multiple viewers, of the entire audience of the video stream, or the like.

In some exemplary embodiments, the action may be any action selected from the actions performed in Steps 170-178, a combination thereof, or the like. Additionally or alternatively, the action may be determined based on an action performed in one or more of Steps 170-178.

On Step 170, an aggregated demographic information of the audience may be estimated based on the demographic information of plurality of viewers. In some exemplary embodiments, the aggregated demographic information of the audience may be determined based on an aggregation of estimated demographic information of each viewer of the plurality of viewers. The demographic of at least one such viewer may be determined in accordance with the disclosed subject matter. It is noted that demographic information of some of the viewers may be determined in other manners, such as based on IP information, based on browsing history, based on available non-handle identifier, based on explicit information provided by the user, or the like. Additionally or alternatively, the aggregated demographic information of the audience may be estimated without having a direct estimation of demographic information of a subset of the audience, such as the set of viewers of which no direct estimation of their demographic information is performed. In some exemplary embodiments, the estimated demographics of the set of viewers may be determined using machine learning techniques, classifications, clustering, or the like, based on similarity to handles of other viewer. Additionally or alternatively, the estimated demographics of the set of viewers may be determined based on simple extrapolation, learned extrapolation, a combination thereof, or the like. The learned extrapolation may take into account that viewers in the set of viewers, on which no analysis was performed, may not necessarily have the same demographic features as analyzed handles. The learned extrapolation may determine the correlation between the participation (and the non-participation) of handles and the estimated demographics of the associated viewers.

In some exemplary embodiments, demographic information may be estimated for a certain viewer based on a handle-based analysis (such as exemplified in Steps 140 and 150 of FIG. 1A). Demographic data of at least a portion of the set of viewers may be estimated based on the demographics of the certain viewer.

On Step 172, an added content may be provided based on the aggregated demographic information of the audience.

In some exemplary embodiments, the added content may be provided to the viewer herself, to another viewer, to a plurality of viewers, to the entire audience, or the like. The added content may be provided in the video stream, externally to the video stream, in another video stream, or the like. The added content may be provided during provisioning of the video stream, immediately after provisioning the video stream, in a future timing, or the like.

In some exemplary embodiments, the added content may be determined based on the estimated demographic information of the viewer. As an example, the added content may comprise suggestion of additional video streams to be provided to the viewer, or to other viewers based on the demographic information of the viewer, a campaign targeted to the viewer, or the like. As another example, the added content may comprise information to be provided to the content provider, such as streamlining suggestions, suggestion for improving the content of the video stream, providing a real-time feedback to the content provider or the streaming platform or the like.

Additionally or alternatively, the added content added may be determined based on the aggregated demographic information of the audience of the video stream. As an example, the added content may be an advertising campaign implemented within the video stream, and provided to an audience of the video stream based on the aggregated demographic data and without performing personalized matching of the matched campaign to a specific member. The advertising campaign may be selected based on the aggregated demographic information of the audience to be suitable for promotion by the content provider.

Additionally or alternatively, the added content may be determined based on aggregated demographic information of the audience in a certain time window. The added content may be added to the video-stream within the time window, close to the time window, such as in few seconds, less than a minute, or the like.

In some exemplary embodiments, the added content may be, for example, an advertisement shown to a specific user.

For example, a specific user may receive a designated in-stream advertisement, such as a pre-roll advertisement (before the stream begins), a mid-roll advertisement (e.g., a video inserted during the stream instead of showing the stream), a post-roll advertisement, a popup banner in-stream, an outstream ad, or the like. In some cases, the added content may be a suggested video, which may or may not be paid content. As an example, the added content may be an organic recommendation of an additional stream.

In some exemplary embodiments, the added content may be provisioned to add viewers of the stream. As an example, the streamer may capture herself while providing an advertisement to a sponsor, such as by endorsing the sponsor's product during the stream. As another example, an in-stream product placement may be performed. The streamer may wear a cloth by an advertiser, consume a specific product during the stream, or the like. Such added content may be provisioned to all viewers of the stream at the same time.

On Step 174, a compensation for a content provider may be computed. In some exemplary embodiments, the compensation may be configured to be provided to the content provider for implementing a campaign within the video stream during. Additionally or alternatively, the compensation may be configured to be provided to the streaming platform, a gaming platform associated with the video stream (such as in a case of a gamer streaming a live game), a combination thereof, or the like. In some exemplary embodiments, the compensation may be computed based on an analysis of the actual audience of the video stream and aggregated demographic data of the audience. In some exemplary embodiments, the compensation may be computed based on an agreement or compensation model agreed upon. In some exemplary embodiments, an auctioning mechanism may be utilized, such as as Real-Time Bidding (RTB). Each advertiser of a plurality of participating advertisers in the RTB may be enabled to provide a bid for presenting a campaign within the video, that may be based on the estimated aggregated demographic data and a suggested compensation.

In some exemplary embodiments, the compensation may be computed based on one or more profile-based compensations and on a number of estimated viewers having a demographic profile that corresponds to each profile-based compensation. As an example, a winning bid may define a first compensation of $X_2$ dollars for a first targeted profile of {female viewers, located in the USA} and a second compensation of $Y_2$ dollars for a second targeted profile of {female viewers, located in Europe}, without defining any compensation for the third targeted profile of {female viewers, located in Asia} or other non-targeted profiles. As another example, a second bid may define a first compensation of $X_3$ Euros for a first targeted profile of {viewers above 30 years old} and a second compensation of $Y_2$ Euros for a second targeted profile of {viewers between 20 and 30 years old}. The second bid may or may not define a compensation for non-targeted profiles, e.g., {viewers below 20 years old}, may define a negative compensation for such profiles, or the like. In some exemplary embodiments, the compensation may be computed as $C = \Sigma n_i c_i$, wherein C denotes the estimated compensation, $n_i$ denotes a number of viewers in the estimated audience having the $i^{th}$ targeted demographic profile, and $c_i$ denotes the profile-based compensation for the $i^{th}$ targeted demographic profile. Referring to the above-mentioned example, the estimated compensation of the bid of the first advertiser may be C=X. (the number of female members located in the USA)+Y. (the number of female members located in Europe)+Z. (the number of female members located in Asia).

In some exemplary embodiments, the compensation may be indifferent to a number of viewers in the estimated audience having the non-targeted demographic profile, or viewers that no demographic information was estimated thereto, or viewers having a partial targeted demographic profile, or the like. As an example, a bid of a first advertiser may define a first compensation of X dollars for a first targeted profile of {female members, located in the USA}, a second compensation of Y dollars for a second targeted profile of {female members, located in Europe} and a third compensation of Z dollars for a third targeted profile of {female members, located in Asia}. The audience may comprise viewers not belonging to any of the targeted profiles, e.g., male members, female members not from the USA, Europe or Asia), or viewers that their location has not been identified, or the like. Such viewers may be associated with non-targeted profiles, or partially targeted profiles and may not be taken into account in the estimated compensation, despite the matched campaign being provided thereto.

On Step 176, a promotion action may be performed based on the estimated demographic information of the viewer.

In some exemplary embodiments, the promotion action may comprise informing additional users of the live-streaming platform about the video stream. A determination the additional users may be performed based on the estimated demographic information of the viewer, such as identifying users having a potential interest similar to the viewer, having demographic data related to the content of the video stream that is similar to the estimated demographic information of the viewer, or the like.

Additionally or alternatively, the promotion action may comprise promoting other video streams for the viewer based on the estimated demographic information of the viewer, such as suggesting other channels for the viewers, offering the viewer other videos, products, content, or the like.

Additionally or alternatively, the promotion action may comprise advertising the video stream to targeted audiences external to the live-streaming platform. In some exemplary embodiments, a determination of the targeted audience, the platform on which the promotion action is perform, parameters of the promotion action, such as timing, type, or the like, may be performed based on the estimated demographic information of the viewer.

In some exemplary embodiments, the promotion action may be performed within the video stream, such as by adding an effect to the video stream; within the streaming platform, such as outside the viewing window, in a search bar, or the like.

On Step 178, SLA property may be modified. In some exemplary embodiments, the SLA property may be modified to increase, or decrease the service level a specific viewer receives, a service level a specific stream to an audience receives, or the like. In some cases, the modification of the SLA property may affect resource utilization when provisioning the stream. In some cases, the SLA property may modified by, for example, by modifying available bandwidth to be provided for the video stream, modifying a number of servers responsible for serving the stream, selecting a codec, modifying the resolution of the stream, modifying streaming protocol properties affecting the manner in which the stream is provisioned and consumed, selecting different streaming protocol, modifying bit-rate of the stream, or the like. The SLA property may be modified with respect to streaming to a specific viewer. Additionally, or alternatively, the SLA property may be modified with respect to the stream, effecting the entire audience consuming the stream.

Figure 2:
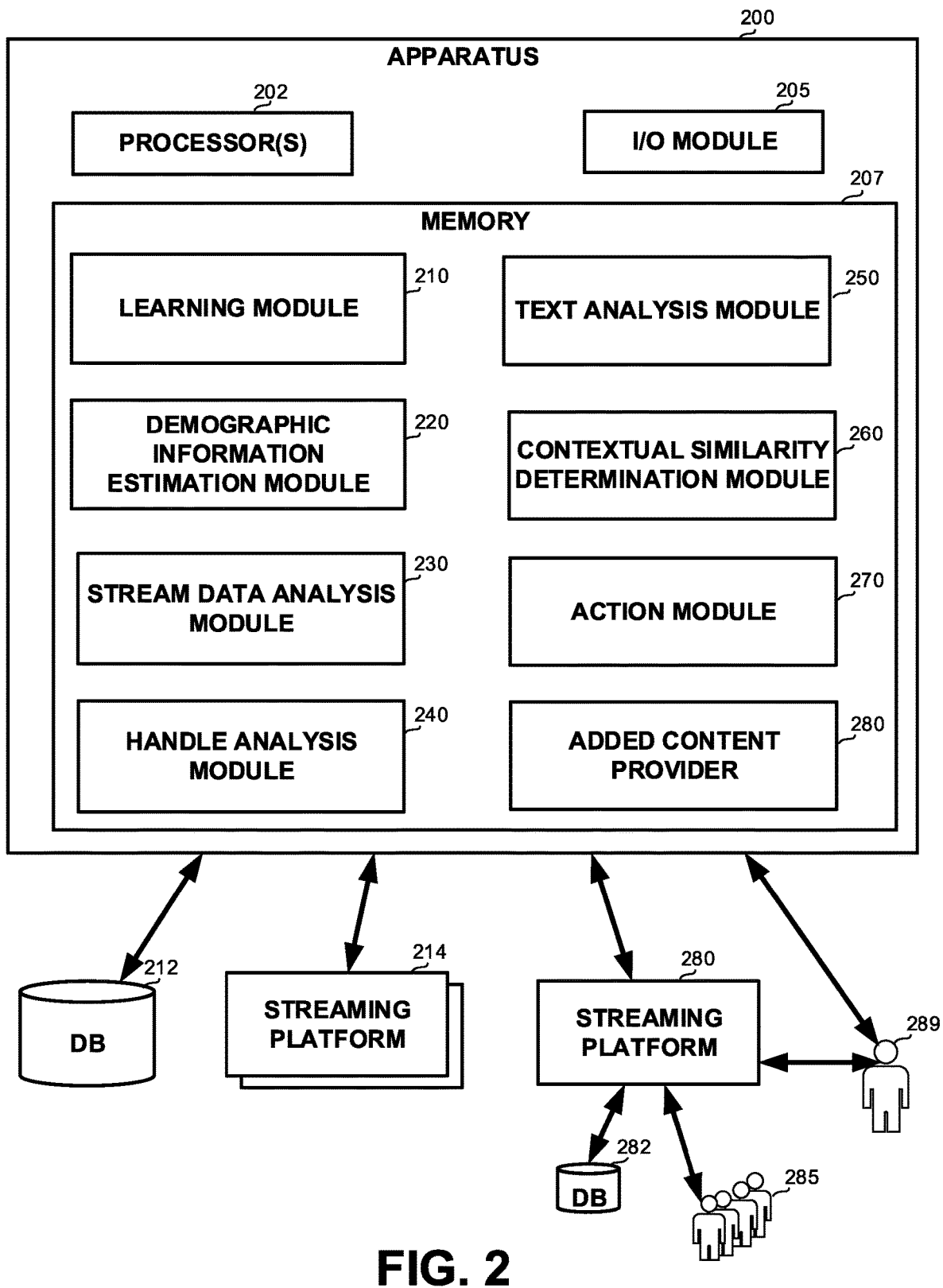
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter. An Apparatus 200 may be configured to support parallel user interaction with a real world physical system and a digital representation thereof, in accordance with the disclosed subject matter. Apparatus 200 may be configured to estimate demographic information of audiences of one-to-many videos, of live-streamed videos, or the like.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of its subcomponents.

In some exemplary embodiments of the disclosed subject matter, Apparatus 200 may comprise an Input/Output (I/O) module 205. I/O Module 205 may be utilized to provide an output to and receive input from a user, such as, for example, Content Provider 289, from a Streaming Platform 280, or other one or more Streaming Platforms 214, from a Database 212, or the like. In some exemplary embodiments, I/O Module 205 may be utilized to obtain a stream data of a video stream. The video stream may be a stream of video provided to an audience over the Internet via a live-streaming platform, such as Streaming Platform 280. I/O Module 205 may be utilized to obtain the stream data from Streaming Platform 280, from a different platform observing Streaming Platform 280, or the like. Additionally or alternatively, I/O Module 205 may be utilized to obtain additional information from Streaming Platform 280, such as handles of viewers, participation information of the viewers, or the like.

In some exemplary embodiments, Apparatus 200 may comprise Memory 207. Memory 207 may be a hard disk drive, a Flash disk, a Random-Access Memory (RAM), a memory chip, or the like. In some exemplary embodiments, Memory 207 may retain program code operative to cause Processor 202 to perform acts associated with any of the subcomponents of Apparatus 200.

In some exemplary embodiments, Learning Module 210 may be configured to collect stream data and demographic data of handles, to train classifiers or provide training data to be utilized by Demographic Information Estimation Module 220 for estimating demographic data of each handle and demographic data of the audience in general. In some exemplary embodiments, Learning Module 210 may be configured to obtain data from relevant databases (such as Database 212) related to Device 200, may provide data to such databases, or the like. In some exemplary embodiments, Learning Module 210 may be configured to obtain information of previously analyzed streams, analyzed handle names, handle names with known demographic data, or the like. Additionally or alternatively, Learning Module 210 may be configured to obtain auxiliary data, such as declension of names in different languages, information collected about handles from other sources, or the like.

In some exemplary embodiments, Learning Module 210 may be configured to train one or more classifiers (or generate training data for creating such classifiers by Demographic Information Estimation Module 220, Stream Data Analysis Module 230, Handle Analysis Module 240, or the like), that can predict one or more demographic datum based on one or more features of the stream or the handle. In some exemplary embodiments, Learning Module 210 may be configured to be operated offline, prior to a certain video stream which its audience it to be analyzed being streamed, or the like.

In some exemplary embodiments, Demographic Information Estimation Module 220 may be configured to estimate demographic information of an audience of a video stream (such as Audience 285) or a portion thereof, or the like. In some exemplary embodiments, Demographic Information Estimation Module 220 may be configured to be operated in real time for a video stream being provided to an audience. In some exemplary embodiments, Audience 285 may comprise multiple viewers, such as tens, hundreds, thousands, or the like. Demographic Information Estimation Module 220 may be configured to estimate demographic information of a plurality of viewers comprised by Audience 285 of the video stream, such as a portion of Audience 285, an entirety of Audience 285, or the like. Demographic Information Estimation Module 220 may be configured to estimate demographic information of each viewer of a plurality of viewers of the video stream separately. Demographic Information Estimation Module 220 may be configured to automatically estimate the demographic information of the viewer based on the stream data and based on the handle of the viewer. Then, Demographic Information Estimation Module 220 may be configured to aggregate the estimated demographic information of each viewer of the plurality of viewers to estimate demographic information of the entire Audience 285.

In some exemplary embodiments, Demographic Information Estimation Module 220 may be configured to estimate an aggregated demographic information of the audience based on the demographic information of the plurality of viewers. In some exemplary embodiments, the audience may comprise a set of additional viewers in addition to the plurality of viewers, on which no demographic information is estimated. Demographic Information Estimation Module 220 may be configured to estimate the aggregated demographic information without having a direct estimation of the demographic information of the set of additional viewers.

Additionally or alternatively, Demographic Information Estimation Module 220 may be configured to estimate the aggregated demographic information of the entire audience based on an extrapolation of the demographic information of the plurality of viewers (e.g., the portion of the audience which the demographic information is estimated). As an example, given that 50% of the known viewers are male, Demographic Information Estimation Module 220 may be configured to estimate that 50% of the entire audience are male. Additionally or alternatively, Demographic Information Estimation Module 220 may be configured to perform learned extrapolation, such as by applying machine learning techniques, or the like. As an example, Demographic Information Estimation Module 220 may be configured to estimate, based on an assumption established in previous analysis, based on studies, or the like, that male viewers tend to participate more often than female viewers, and thus, if 50% of the participating handles are determined to be male, then only 20% of the entire audience are male.

In some exemplary embodiments, Stream Data Analysis Module 230 may be configured to analyze the stream data of the video stream. In some exemplary embodiments, the stream data may comprise information describing a content of the video stream, such as a content type of the video stream, a language of the video stream, a time in which the video stream is provided (such as what time of the day), information about a streamer providing the video stream (age, language, gender, or the like), or the like. In some exemplary embodiments, Demographic Information Estimation Module 220 may be configured to estimate aggregated demographic information of viewers based on analysis of the stream data performed by Stream Data Analysis Module 230. As an example, the content of the stream may be indicative of interests of the viewers, educational level of the viewers, or the like. As another example, the time of the day in which the video stream is provided may be indicative of the averaged ages of the audience. Additionally or alternatively, in some exemplary embodiments, Demographic Information Estimation Module 220 may be configured to estimate aggregated demographic information of viewers based on analysis of the stream data performed by Stream Data Analysis Module 230 in combination of analysis of the handle and the messages thereof as performed by Handle Analysis Module 240 and Text Analysis Module 250. As an example, based on analysis of the handle, Demographic Information Estimation Module 220 may be configured to estimate a gender of the viewer. The estimated gender in combination of the stream data analysis may be indicative of other demographic features, such as age. As an example, the handle "Julia9999" may be associated with a female, and given a stream data indicative of anti-aging content, the age of the viewer may be estimated accordingly.

In some exemplary embodiments, Handle Analysis Module 240 may be configured to analyze handles of viewers of the video stream. In some exemplary embodiments, each viewer may be identified in the video stream using a unique handle. In some exemplary embodiments, Handle Analysis Module 240 may be configured to analyze the handles to estimate the demographic information therefrom without relying on textual analysis of messages written by the viewer. Handle Analysis Module 240 may be configured to analyze a text defining the handle to determine a gender of the viewer, a nationality of the viewer, an age of the viewer, or the like. Additionally or alternatively, Handle Analysis Module 240 may be configured to determining the demographic information based on only a sub-portion of the handle.

In some exemplary embodiments, Demographic Information Estimation Module 220 may be configured to estimates demographic information of handles based on participation of the handles in the Streaming Platform 280, in other Streaming Platforms 214, or the like. In some exemplary embodiments, the participation of the viewers may be by creating texts, messages, viewing a certain video, or the like. The participation may be during viewing the video stream, in addition to viewing the video stream, prior to viewing the video stream, or the like.

In some exemplary embodiments, Text Analysis Module 250 may be configured to obtain and analyze texts or messages associated with each handle. Demographic Information Estimation Module 220 may be configured to determine based on the analysis performed by Text Analysis Module 250 estimate demographic information of the viewer associated with the relevant handle. In some exemplary embodiments, Text Analysis Module 250 may be configured to obtain the messages, such as via I/O Module 205, from Streaming Platform 280. The messages may be performed while providing the video stream of which Audience 285 being analyzed, prior to providing the video stream, during a provisioning of a different video stream, historic messages, from a Database 282 associated with Streaming Platform 280, or the like. Additionally or alternatively, the messages may be obtained from one or more Streaming Platforms 214 different than Streaming Platform 280. Text Analysis Module 250 may be configured to identify publicly visible in Streaming Platforms 214 that belong to users having user names that may be similar to the relevant handle, such as user names having at least 80%, 90%, or the like similarity to the handle. Text Analysis Module 250 may be configured to analyze such messages as if are provided by the handle. Additionally or alternatively, Text Analysis Module 250 may be configured to analyze other types of text written by the viewers.

In some exemplary embodiments, Demographic Information Estimation Module 220 may be configured to estimate, based on the analysis performed Text Analysis Module 250, different features of the viewer, such as languages (e.g., the language utilized by the viewer in Streaming Platform 280, the native language of the viewer, other languages known to the viewer and a level of each language, or the like), gender, age, determining if the viewer is a native English speaker, and if not, what is her native language, cultural preferences, political preferences, or the like.

Additionally or alternatively, Demographic Information Estimation Module 220 may be configured to estimate, based on the analysis performed Text Analysis Module 250 and the analysis performed by Stream Analysis Module 240, additional demographics of the handles, such as nationality, location, or the like (e.g., based on an analysis of the language and content performed by Stream Analysis Module 240; historic streams types and times that were watched by that handle; along with demographic information determined Text Analysis Module 250 (or additionally or alternatively, by Handle Analysis Module 240). As an example, when Text Analysis Module 250 estimates that the native language of the handle is Czech, the nationality of the viewer may be estimated to likely be Czech. As another example, when Text Analysis Module 250 estimates that language of the viewer is English and Stream Analysis Module 240 estimates that the timeline of the video stream fits USA, and the topic of the video stream fits USA, the location of the viewer may be estimated to likely be USA or Canada.

In some exemplary embodiments, Contextual Similarity Determination Module 260 may be configured to utilize a handle similarity measurement based on groups of handles having similar estimated demographic information, to implicitly define contextual similarity between handles. Contextual Similarity Determination Module 260 may be configured to define a conceptual similarity between two alphabetical elements in two handles, that are textually different in a measurement above a spelling mistake threshold.

In some exemplary embodiments, Action Module 270 may be configured to determine an action to be performed based on the demographic information of the viewer. In some exemplary embodiments, the action may be providing an added content in the video stream based on the estimated demographic information of the viewer. Additionally or alternatively, the action may be providing a content externally to the video stream based on the estimated demographic information of the viewer. Additionally or alternatively, the action may be providing a content to another viewer based on the estimated demographic information of the viewer. In some exemplary embodiments, the added content may an advertising campaign to be implemented within the video stream. Additionally or alternatively, the added content may be provided to the audience of the video stream based on the estimated aggregated demographic data and without performing personalized matching of the campaign to a specific viewer.

In some exemplary embodiments, Action Module 270 may be configured to perform the action automatically during providing the video stream, after providing the video stream, in a different video stream, or the like.

In some exemplary embodiments, Added Content Provider 280 may be configured to provide an added content in the video stream based on the aggregated demographic information of the audience, in accordance with an action determined by Action Module 280, or the like.

In some exemplary embodiments, Added Content Provider 280 may be configured to automatically select the added content based on the estimated aggregated demographic data of the audience in real time, in response to initiating the streaming of the video stream, prior to streaming the video stream, or the like.

Figure 3:
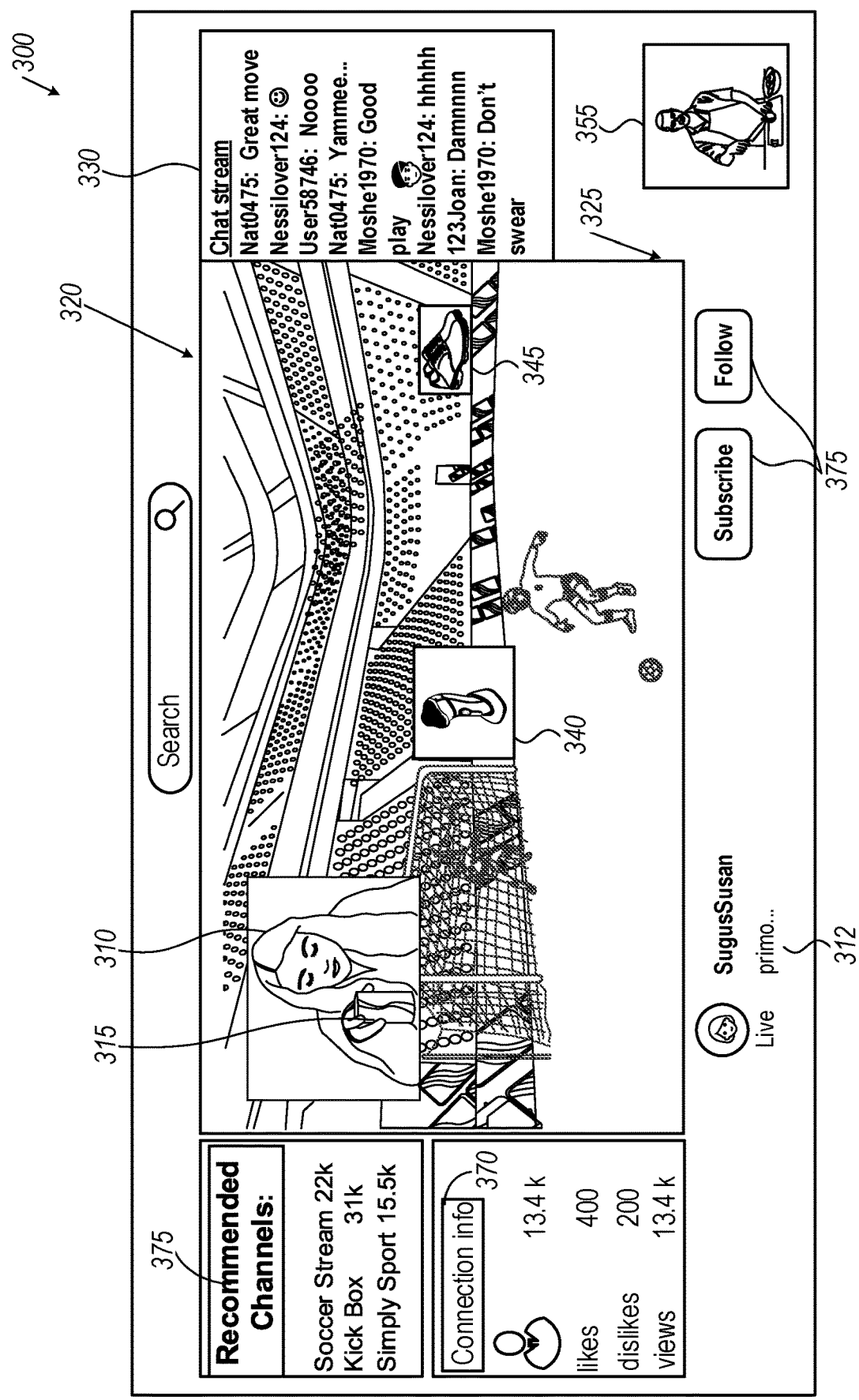
FIG. 3 shows a schematic illustration of an exemplary implementation, in accordance with some exemplary embodiments of the disclosed subject matter.

Referring now to FIG. 3 showing a schematic illustration of an exemplary environment and architecture in which the disclosed subject matter may be utilized, in accordance with some exemplary embodiments of the disclosed subject matter.

In some exemplary embodiments, a Content Provider 310 may initiate a streaming of a Video 320 in a Streaming Platform 300. In some exemplary embodiments, Video 320 may be a live-streamed video of Content Provider 310 broadcasting herself playing a football electronic Game 325 to a live audience online. Platform 300 may be a designated website for providing a certain type of videos, such as Twitch™, Huya-Live™, DouYu™, Bilibili™, or the like. In some exemplary embodiments, Video 320 may be provided to an audience comprising a plurality of viewers, such as above 1,000 viewers, above 10,000 viewers, or the like. (As an example, according to Connection Information 370 of Streaming Platform 300, the audience comprise 13,400 viewers). Additionally or alternatively, Video 320 may be streamed to different viewers of the audience at different times, such as about one hour apart, about few hours apart, or the like. Additionally or alternatively, a copy of Video 320 may be available for the audience to watch for unlimited time after being broadcast, for a limited time, such as one hour, 24 hours, or the like. Each member of the audience may be enabled to watch Video 320 at a different timing. In some exemplary embodiments, only handles of the viewers may be available from Streaming Platform 300. Additionally or alternatively, Streaming Platform 300 may not have any other information of the viewers, may be restricted from providing PII of the viewers, may not provide access to any identifiable information of the viewers, or the like.

In some exemplary embodiments, a list of the viewers of Video 320 may be obtainable from Streaming Platform 300, such as from Connection Information 370, provided directly by Streaming Platform 300, or the like. Some viewers of the audience may be active viewers, such as viewers participating in Chat 330, viewers interacting in non-textual way, such as by clicking on a Button 335, or the like. Additionally or alternatively, many viewers may not be active. It may be noted that the demographics of participating viewers may be different than demographics of less active viewers.

In some exemplary embodiments, the audience may be enabled to provide feedback to Video 320, Game 325, or the like, such as using a chat service as viewed in Chat Box 330, a designated communication service associated with Game 325, such as expressing an interaction with Game 325, generating visual feedback, a graphic display, or the like, into Game 325, using a designated input device such as a joystick, a controller, a motion sensing device, or the like. The interaction or the visual feedback may be shown on Video 320 within Game 325, outside Game 325, in a separated window, or the like. Additionally or alternatively, the interaction may comprise audio feedback delivered through speakers or headphones, and presented in Video 320 through Game 325.

In some exemplary embodiments, a stream data of Video 320 may be obtained directly from Streaming Platform 300, indirectly from observing Streaming Platform 300, or the like. Additionally or alternatively, the stream data may be provided by or obtained from Content Provider 315, such as by a software component, a plug0in, or the like, installed by Content Provider 315 and configured to observe the stream data during streaming of Video 320. As an example, a content type of Video 320 may be determined based on visual analysis of Video 320, based on information publicly available in Streaming Platform 300, such as in Recommended Channels 375, or the like. As an example, the type of content may be determined to be sports, based on Recommended Channels 375, or sport video games based on the type of Streaming Platform 300, the subtype may be determined as soccer based on analysis of the stream, identifying a soccer field, ball, or the like in Video 320, or the like. Additionally or alternatively, a metadata of Content Provider 315 may be obtained such as from a textual input (e.g., 312) provided in Streaming Platform 300, information provided directly by Content Provider 315 herself or by Streaming Platform 300, or the like.

In some exemplary embodiments, demographic information of each viewer of Video 320 may be estimated based on the stream data and based on the handle of the viewer.

In some exemplary embodiments, demographics for participating viewers (e.g., handles who communicate, such as in Chat 330) may be estimated based on analysis of such participation, such as analysis of messages written by the handle, symbols used thereby, or the like. The demographics may comprise native language, language used in the chat, age, gender, or the like. Additionally or alternatively, historical participation of such handles (such as streams types and times that were watched by that handle) may be obtained from Streaming Platform 300, an observation thereof, or the like. Additionally or alternatively, participation of the viewers in other platforms may be analyzed. As an example, a participation (e.g., messages, chat, viewing of videos, watching history, or the like) of users having usernames similar to the handle "Nat0475" may be searched in other platforms, such as in YouTube™, or the like. Additionally or alternatively, historical participation of the viewer in Streaming Platform 300 may be analyzed, such as by analyzing historic messages that are identified as originating from the handle during a provisioning of a different video stream via Streamlining Platform 300.

Additionally or alternatively, the handle itself may be analyzed to estimate the demographic information of the viewer without relying on textual analysis of messages written by the viewer. In some exemplary embodiments, a text defining the handle, such as a bio, a profile description, or the like, may be analyzed to estimate the demographic information of the viewer such a gender of the viewer, a nationality of the viewer, an age of the viewer, or the like. Additionally or alternatively, the text may be the handle name itself, e.g., as a string, a set of alphabetical elements comprised by the handle, or the like. A classification algorithm, such as a neural network, may be utilized to determine the demographic information of the viewer based on the handle.

In some exemplary embodiments, an estimated demographic information of the entire audience may be estimated based on aggregation of demographic information of at least a portion of the handles.

In some exemplary embodiments, an added content may be provided in Video 320 based on the aggregated demographic information of the audience. The added content may comprise one or more advertising campaigns implemented within Video 320. Each of the one or more advertising campaigns may be provided to the audience of Video 320 based on the aggregated demographic information of the audience and without performing personalized matching of the campaign to a specific viewer. The added content may be selected automatically based on the aggregated demographic information of the audience of Video 320, in real time, in response to initiating the streaming of Video 320, or the like. In some exemplary embodiments, the added content may be selected by an auction between a plurality of providers, such as an RTB between a plurality of participating advertisers, that may be initiated prior to Video 320 being broadcasted, in response to initiating streaming of Video 320, in response to Content Provider 310 initiating Game 325, in response to a statement provided by Content Provider 310 or other related platform, or the like. Each advertiser of the plurality of participating advertisers may provide a bid for presenting a campaign within Video 320 and based on the aggregated demographic information of the audience of Video 320. Additionally or alternatively, another added content may be provided external to Video 320, such as in an adjacent Advertising Window 355. In some exemplary embodiments, the added content may be selected based on demographic information estimated based on historic viewing information of a handle with respect to historic streams. As an example, given that a handle watches a specific type of streams, such as "Korean cooking" videos in Korean, may be indicative of speaking Korean, being interested in cooking, or the like, even if the current video stream not necessarily being indicative of such demographics. Accordingly, the campaign provided in Advertising Window 355 may be adapted to such demographic features, e.g., presenting a cooking related campaign in Korean.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a stream data of a video stream, wherein the video stream is a stream of video provided to an audience over the Internet via a live-streaming platform, the audience comprises a silent viewer, the silent viewer watches the video stream without any active participation during the provisioning of the video stream, wherein the stream data comprise information describing a content of the video stream;
    obtaining a handle of the silent viewer of the video stream, the handle being a local identifier of the silent viewer in the live-streaming platform, the handle being available to external users viewing the video stream, wherein the live-streaming platform does not make available to external entities other information that is available to the live-streaming platform regarding the silent viewer;
    estimating demographic information of the silent viewer, wherein said estimating the demographic information of the silent viewer is performed automatically by a computerized device based on the stream data and based on the handle of the silent viewer, the computerized device being external to the live-streaming platform, whereby estimating demographic information without being privy to the other information regarding the silent viewer that is available to the live-streaming platform; and
    performing an action based on the estimated demographic information of the silent viewer.

2. The method of claim 1, wherein said estimating the demographic information comprises:
    obtaining one or more messages associated with the handle; and
    analyzing the one or more message to estimate the demographic information.

3. The method of claim 2, wherein the one or more messages comprise one or more online chat messages that are performed over the live-streaming platform, wherein the one or more online chat messages comprise historic messages that are identified as originating from the handle during a provisioning of a different video stream via the live-streamlining platform.

4. The method of claim 2, wherein the one or more messages are obtained from a different platform than the live-streaming platform, wherein the one or more messages are identified as belonging to a user having a user name that is within a similarity measurement threshold to the handle, wherein one or more messages are publicly visible in the different platform.

5. The method of claim 1, wherein said estimating the demographic information comprises: analyzing a text defining the handle to estimate the demographic information therefrom.

6. The method of claim 1, wherein members of the audience are enabled to participate by utilizing an online chat that is performed by the live-streaming platform during the provisioning of the video stream, wherein the silent viewer does not participate in the online chat.

7. The method of claim 5, wherein said analyzing the text defining the handle comprises: determining, based on the text defining the handle, at least one of: a gender of the silent viewer, a nationality of the silent viewer, and an age of the silent viewer.

8. The method of claim 5, wherein said analyzing the text defining the handle comprises: extracting a sub-portion of the text defining the handle; and determining the demographic information based on the sub-portion of the text defining the handle.

9. The method of claim 5, wherein said analyzing the text defining the handle comprises: utilizing a handle similarity measurement, wherein the handle similarity measurement is based on groups of handles having similar estimated demographic information associated therewith, whereby implicitly defining contextual similarity between handles.

10. The method of claim 9, wherein the contextual similarity comprises a conceptual similarity between a first alphabetical element in a first handle and between a second alphabetical element in a second handle, wherein the first alphabetical element and the second alphabetical element are textually different in a measurement above a spelling mistake threshold.

11. The method of claim 1, wherein said estimating the demographic information comprises:
obtaining historic viewing information of the handle with respect to historic streams, wherein each historic stream is associated with an historic stream data; and
estimating the demographic information based on the historic stream data.

12. The method of claim 1, wherein the stream data comprises at least one of:
a content type of the video stream;
a language of the video stream;
a time in which the video stream is provided; and
information about a streamer providing the video stream.

13. The method of claim 1,
wherein the audience comprises a plurality of viewers of the video stream in addition to the silent viewer, wherein the method further comprises:
obtaining the handles and estimating demographic information with respect to the plurality of viewers of the video stream; and
wherein said performing the action comprises:
estimating an aggregated demographic information of the audience based on the demographic information of the plurality of viewers and the demographic information of the silent viewer; and
performing one or more actions based on the aggregated demographic information of the audience.

14. The method of claim 13, wherein the audience comprise the plurality of viewers and a set of additional viewers, wherein said estimating the aggregated demographic information is performed without having a direct estimation of the demographic information of the set of additional viewers.

15. The method of claim 1, wherein said performing the action comprises at least one of:
providing an added content in the video stream based on the estimated demographic information of the silent viewer;
providing a content externally to the video stream based on the estimated demographic information of the silent viewer;
providing a content to another viewer based on the estimated demographic information of the silent viewer;
performing a promotion action based on the estimated demographic information of the silent viewer to promote the video stream to at least one potential viewer; and
modifying resources allocated for streaming the video stream, whereby affecting a service level of provisioning of the video stream.

16. A computerized apparatus having a processor, the processor being adapted to perform the steps of:
obtaining a stream data of a video stream, wherein the video stream is a stream of video provided to an audience over the Internet via a live-streaming platform, the audience comprises a silent viewer, the silent viewer watches the video stream without any active participation during the provisioning of the video stream, wherein the stream data comprise information describing a content of the video stream;
obtaining a handle of the silent viewer of the video stream, the handle being a local identifier of the silent viewer in the live-streaming platform, the handle being available to external users viewing the video stream, wherein the live-streaming platform does not make available to external entities other information that is available to the live-streaming platform regarding the silent viewer;
estimating demographic information of the silent viewer, wherein said estimating the demographic information of the silent viewer is performed automatically by a computerized device based on the stream data and based on the handle of the silent viewer, wherein the computerized device being external to the live-streaming platform, whereby estimating demographic information without being privy to the other information regarding the silent viewer that is available to the life-streaming platform; and
performing an action based on the estimated demographic information of the silent viewer.

17. The computerized apparatus of claim 16,
wherein the audience comprises a plurality of viewers of the video stream in addition to the silent viewer, wherein the method further comprises:
obtaining the handles and estimating demographic information with respect to plurality of viewers of the video stream; and
wherein said performing the action comprises:
estimating an aggregated demographic information of the audience based on the demographic information of the plurality of viewers and the demographic information of the silent viewer; and
performing one or more actions based on the aggregated demographic information of the audience.

18. A computer program product comprising a non-transitory computer readable storage medium retaining program instructions, which program instructions when read by a processor, cause the processor to perform a method comprising:
obtaining a stream data of a video stream, wherein the video stream is a stream of video provided to an audience over the Internet via a live-streaming platform, the audience comprises a silent viewer, the silent viewer watches the video stream without any active participation during the provisioning of the video stream, wherein the stream data comprise information describing a content of the video stream;
obtaining a handle of the silent viewer of the video stream, the handle being a local identifier of the silent viewer in the live-streaming platform, the handle being available to external users viewing the video stream, wherein the live-streaming platform does not make available to external entities other information that is available to the live-streaming platform regarding the silent viewer;
estimating demographic information of the silent viewer, wherein said estimating the demographic information of the silent viewer is performed automatically by a computerized device based on the stream data and based on the handle of the silent viewer, wherein the computerized device being external to the live-streaming platform, whereby estimating demographic information without being privy to the other information regarding the silent viewer that is available to the life-streaming platform; and performing an action based on the estimated demographic information of the silent viewer.

19. A computer program product of claim 18, wherein the audience comprises a plurality of viewers of the video stream in addition to the silent viewer, wherein the method further comprises:

obtaining the handles and estimating demographic information with respect to the plurality of viewers of the video stream; and wherein said performing the action comprises:
  estimating an aggregated demographic information of the audience based on the demographic information of the plurality of viewers and the demographic information of the silent viewer; and
  performing one or more actions based on the aggregated demographic information of the audience.

20. The method of claim 14, wherein said performing the one or more actions comprises:

modifying a Service Level Agreement (SLA) property based on the aggregated demographic information of the audience, whereby improving resource utilization associated with the provisioning of the video stream via the live-streaming platform.

* * * * *